(No Model.)
J. F. McELROY.
SYSTEM OF ELECTRICAL DISTRIBUTION.
No. 525,769. Patented Sept. 11, 1894.
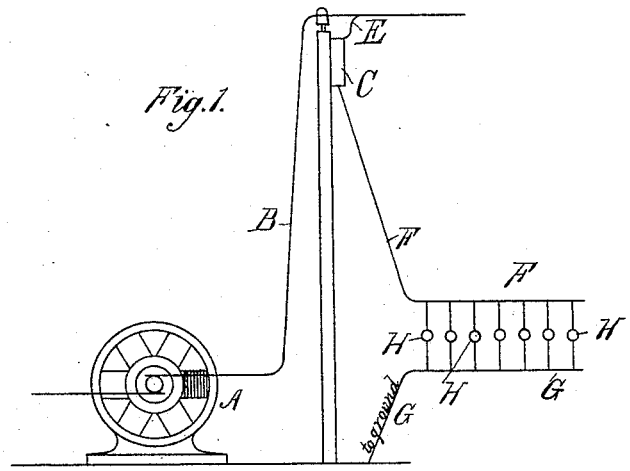
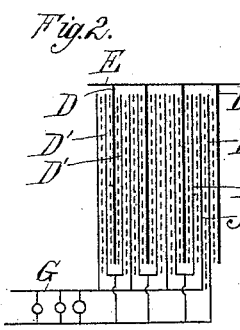
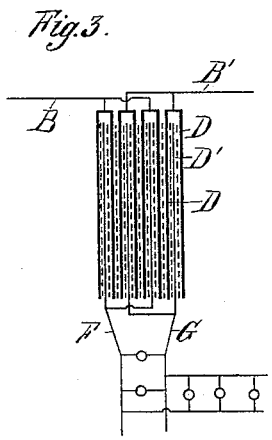
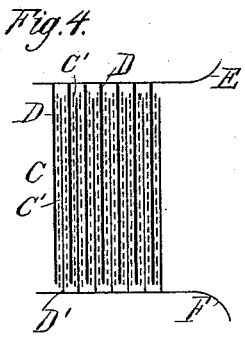
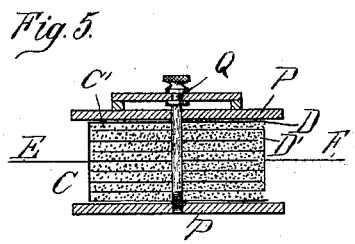
Witnesses:
O. F. Barthel
L. J. Whittemore
Inventor:
James F. McElroy,
By Wm. S. Sprague & Son
Attorneys.

UNITED STATES PATENT OFFICE.

JAMES F. McELROY, OF LANSING, MICHIGAN.

SYSTEM OF ELECTRICAL DISTRIBUTION.

SPECIFICATION forming part of Letters Patent No. 525,769, dated September 11, 1894.

Application filed October 5, 1887. Serial No. 251,552. (No model.)

*To all whom it may concern:*

Be it known that I, JAMES F. MCELROY, a citizen of the United States, residing at Lansing, in the county of Ingham and State of Michigan, have invented certain new and useful Improvements in Systems of Electrical Distribution, of which the following is a specification, reference being had therein to the accompanying drawings.

This invention relates to new and useful improvements in systems of electrical distribution, and the object of the invention is primarily to reduce the cost of incandescent lighting from a central plant or station.

To this end, my invention embodies the following arrangements: I place at the central station, a high potential, alternating dynamo or generator, and at the local station or stations, I place a converter, consisting of a series of induction plates, separated from each other by a non-conducting substance, and alternately connected into two sets, one set being connected to one pole of the dynamo, (the other pole being grounded) and the other set being connected to the translating devices at the local station. The effect of this arrangement is that the first set of plates is rapidly charged, discharged and recharged with a high potential static charge, which alternates rapidly from positive to negative, and thereby induces in the other set of plates, corresponding charges of a lower potential, which are caused to flow as alternating current through the translating devices, all as more fully hereinafter described. I reduce the potential from high to low by separating the plates of the converter by a non-conductor, the thickness of which depends upon the fall in potential desired, and the quantity of current, and hence the number of lamps that can be run from the converter, I regulate by the size and number of the plates.

In the drawings which accompany this specification Figure 1 illustrates my invention in diagram form. Figs. 2 and 3 show different constructions of inductoriums specifically referred to. Fig. 4 shows a diagram section of one of the converters enlarged. Fig. 5 is a cross-section of the converter illustrating the adjusting devices.

A represents a dynamo, constructed to generate electricity of a high potential, alternately positive and negative.

B represents a main wire or conductor from one pole of said dynamo to the local station.

C represents a converter for reducing the high potential into low potential. Its construction is shown in detail in Fig. 5 in which D, D' represent a series of induction plates, alternately connected together, and C' represents a non-conducting substance which separates the plates D D'.

E represents a local service conductor from the main conductor to the plates of the converter.

F represents a local service conductor from the plates D' to the lamps.

G represents another local service or return conductor, and H represents the incandescent lamps (or translating devices) placed in multiple arc between the service conductors F and G.

In operation, the parts being arranged as shown in Fig. 1, the main line wire B, having a static charge of high potential, rapidly charges and discharges the plates D of the converter, alternately with an opposite potential, the effect of which is to produce an alternating current in plates D', which flows through the lamps, by grounding the service conductor G. If the non-conducting substance C' is of proper thickness, the high potential in the plates D is reduced to a low potential. For a fall from a very high to a very low potential, the plates must be separated by a non-conducting substance of considerable thickness, and by increasing or diminishing the size or number of the plates, the quantity is increased or diminished in proportion. The non-conducting substance between the plates of the converter, I propose to make of elastic material, so that by employing adjustable clamping devices as shown in Fig. 5 the distance between the plates may be increased or decreased within a certain limit, to vary the potential of the induced current at will. The clamping device I have shown comprises the plates P and insulated clamping bolt Q. The elastic non-conductors between the plates, should be of high specific inductive capacity, and may be made porous, corrugated or roughened, so as to be more easily compressible. The converter C, may be combined with the generator either as shown in Fig. 2, or as shown in Fig. 3 in which the inductive field is formed into two sets, one set being connected to one pole and the other set to the other pole of the dynamo.

In constructing the condenser, the well known principles governing induction have to be followed, from which it appears that the induced charge is inversely proportional to the distance between the plates, and is proportional to the specific inductive capacity of the dielectric. The quantity of current which in the static charge of condensing plates is measured in farads, or when changed to current by rapid charge and discharge is measured in ampères, is proportional to the amount of surface in the two plates, *i. e.*, is proportional to the area of one plate multiplied by the number of plates.

In Fig. 3 the two line wires of the generator are connected in multiple arc to the condenser. In this case the thickness and specific inductive capacity of the dielectrics are arranged so as to induce in the wires leading to the lamp circuit the desired difference of potential.

What I claim as my invention is—

1. The method of transformation and utilization of electrical energy, consisting in charging one member of a condenser with electricity of a certain tension and volume and simultaneously therewith, and thereby charging the other member of the said condenser with electricity of different tension and volume, and then discharging the latter and passing the transformed electricity to one or more translating devices, substantially as described.

2. The method of transformation and utilization of electrical energy, consisting in charging one member of a condenser with electricity of high tension and small volume and simultaneously therewith and thereby charging the other member of said condenser with electricity of low tension and great volume, and then discharging the latter and passing the transformed electricity through one or more translating devices, substantially as described.

3. In a system of distribution and conversion of electrical energy, the combination of an alternating current generator, a main extending from one of the poles thereof an electrostatic converter, consisting of two members separated by a dielectric, a connection between the main and one of the members of said converter, and a consumption circuit connecting the other member with the ground, substantially as described.

4. In a system of electrical distribution and conversion of electrical energy, an electrostatic converter, having its members separated by a dielectric, the thickness of which causes the fall in potential, substantially as described.

5. In a system of electrical distribution and conversion of electrical energy, an electrostatic converter having its members separated by an elastic compressible dielectric, the thickness of which causes the fall in potential, substantially as described.

In testimony whereof I affix my signature, in presence of two witnesses, this 24th day of September, 1887.

JAMES F. McELROY.

Witnesses:
P. M. HULBERT,
A. BARTHEL.